US011884512B2

(12) United States Patent
Michel et al.

(10) Patent No.: US 11,884,512 B2
(45) Date of Patent: Jan. 30, 2024

(54) CAR AND ENTITY SAFETY SUPERVISING UNIT FOR AN ELEVATOR

(71) Applicant: Inventio AG, Hergiswil (CH)

(72) Inventors: David Michel, Rotkreuz (CH); Ivo Lustenberger, Buttisholz (CH)

(73) Assignee: INVENTIO AG, Hergiswil (CH)

( * ) Notice: Subject to any disclaimer, the term of this patent is extended or adjusted under 35 U.S.C. 154(b) by 1342 days.

(21) Appl. No.: 16/332,398

(22) PCT Filed: Sep. 14, 2017

(86) PCT No.: PCT/EP2017/073092

§ 371 (c)(1),
(2) Date: Mar. 12, 2019

(87) PCT Pub. No.: WO2018/059944

PCT Pub. Date: Apr. 5, 2018

(65) Prior Publication Data

US 2021/0339981 A1 Nov. 4, 2021

(30) Foreign Application Priority Data

Sep. 29, 2016 (EP) .................................... 16191261

(51) Int. Cl.
*B66B 5/00* (2006.01)
*B66B 1/24* (2006.01)
(Continued)

(52) U.S. Cl.
CPC .............. *B66B 5/0031* (2013.01); *B66B 1/24* (2013.01); *B66B 1/3461* (2013.01); *B66B 1/3492* (2013.01); *B66B 1/46* (2013.01)

(58) Field of Classification Search
CPC ....... B66B 5/0031; B66B 1/24; B66B 1/3461; B66B 1/3492; B66B 1/46; B66B 19/00
See application file for complete search history.

(56) References Cited

U.S. PATENT DOCUMENTS

2009/0277724 A1 11/2009 Thumm et al.
2012/0152659 A1* 6/2012 Husmann ................. B66B 5/18 187/373

(Continued)

FOREIGN PATENT DOCUMENTS

CN 1524058 A 8/2004
CN 1704325 A 12/2005

(Continued)

*Primary Examiner* — Jeffrey Donels

(74) *Attorney, Agent, or Firm* — William J. Clemens; Shumaker, Loop & Kendrick, LLP

(57) ABSTRACT

A car safety supervising unit (SSU) for an elevator having an elevator car displaceable within an elevator shaft includes at least one sensor for sensing car-related parameters and outputting corresponding car-related signals, an I/O interface for inputting input signals into the car SSU and for outputting output signals to external devices and a signal processing unit for processing at least one of the car-related signals and the input signals and for generating the output signals. In an installation operation mode, the signal processing unit processes exclusively the car-related signals and generates the output signals based exclusively on the car-related signals whereby the car SSU accomplishes basic safety functions for safely operating the elevator with a limited number of available sensors. In a normal operation mode, the signal processing unit processes both the car-related signals and the input signals and generates the output signals based on both.

15 Claims, 1 Drawing Sheet

(51) Int. Cl.

| | |
|---|---|
| ***B66B 1/34*** | (2006.01) |
| ***B66B 1/46*** | (2006.01) |

(56) References Cited

U.S. PATENT DOCUMENTS

| | | | | |
|---|---|---|---|---|
| 2013/0041603 | A1* | 2/2013 | Sonnenmoser | B66B 5/0037 702/58 |
| 2014/0117777 | A1 | 5/2014 | Rees et al. | |

FOREIGN PATENT DOCUMENTS

| | | | |
|---|---|---|---|
| CN | 1990371 | A | 7/2007 |
| CN | 101687606 | A | 3/2010 |
| CN | 101765966 | A | 6/2010 |
| CN | 103159104 | A | 6/2013 |
| CN | 103562107 | A | 2/2014 |
| CN | 204702347 | U | 10/2015 |
| EP | 0666236 | A1 | 8/1995 |
| EP | 2022742 | A1 | 2/2009 |
| GB | 869225 | A | 5/1961 |
| JP | H07228443 | A | 8/1995 |
| JP | 2010052924 | A | 3/2010 |
| WO | 2012161085 | A1 | 11/2012 |
| WO | 2016062686 | A1 | 4/2016 |

* cited by examiner

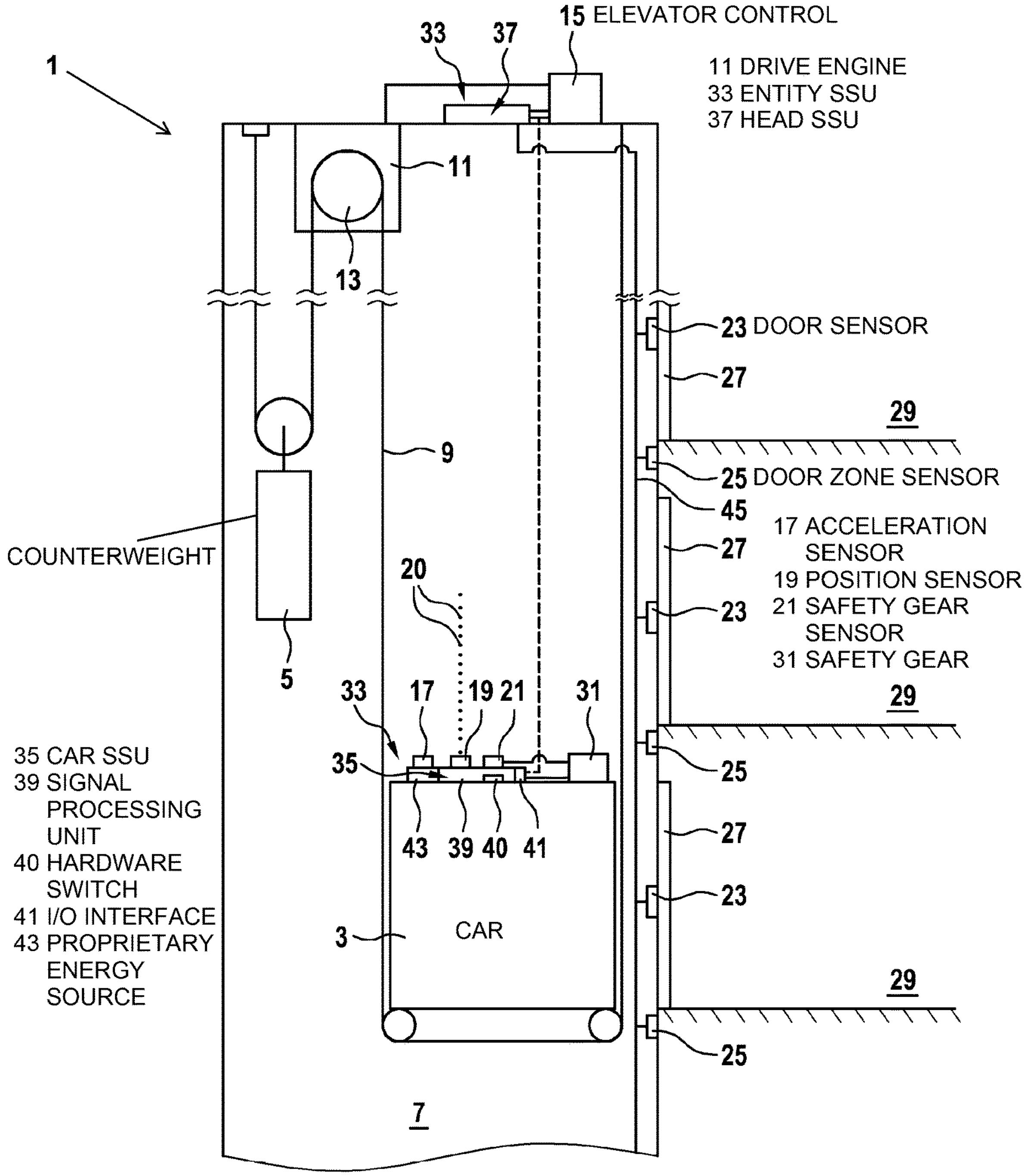
15 ELEVATOR CONTROL
33
37
1
11 DRIVE ENGINE
33 ENTITY SSU
37 HEAD SSU
11
13
23 DOOR SENSOR
27
29
9
25 DOOR ZONE SENSOR
45
COUNTERWEIGHT
27
17 ACCELERATION SENSOR
19 POSITION SENSOR
21 SAFETY GEAR SENSOR
31 SAFETY GEAR
20
23
5
33
17
19
21
31
29
35 CAR SSU
39 SIGNAL PROCESSING UNIT
40 HARDWARE SWITCH
41 I/O INTERFACE
43 PROPRIETARY ENERGY SOURCE
35
25
43
39
40
41
27
23
3
CAR
29
25
7

CAR AND ENTITY SAFETY SUPERVISING UNIT FOR AN ELEVATOR

FIELD

The present invention relates to a car safety supervising unit (SSU) and an entity safety supervising unit for an elevator. Furthermore, the invention relates to an elevator comprising such car SSU or entity SSU.

BACKGROUND

Elevators serve for transporting passengers or items between different levels within a building. For such purpose, an elevator car (sometimes referred to as a cabin) is displaced throughout an elevator shaft (sometimes referred to as a hoistway). As the elevator car is displaced over significant heights, severe safety and security requirements have to be fulfilled.

In conventional elevators, analog safety circuits including safety contacts connected in series are generally included. Upon opening one of the safety contacts, the entire safety circuit is interrupted and safety retaining actions may be initiated.

Such analog systems are currently intended to be replaced by electronic safety systems relying on a bus technology.

For example, EP 2 022 742 A1 discloses an example of such a bus-based electronic security system. The security system is organized in a decentral manner and includes two separate safety supervising units (SSUs). One SSU is comprised in or at the elevator car such as to be displaced together with the car and shall be referred to herein as car SSU. The other SSU is arranged stationary for example within the elevator shaft and will be referred herein as head SSU. The two SSUs are interconnected via a secure bus system. For example, the car SSU monitors all safety relevant motion states of the car relating for example to the car's position, velocity and/or acceleration. The head SSU monitors for example safety contacts such as shaft door contacts or shaft end contacts.

WO 2016/062686 A1 discloses another example of an elevator comprising a decentralized electronic safety system with two separate SSUs.

Decentralized electronic safety systems comprising several distributed SSUs may provide for various benefits. For example, wiring efforts for electrically interconnecting a multiplicity of safety relevant devices such as safety switches may be significantly reduced in a bus-based system. Generally, all safety-relevant devices may be connected to a same bus-based electrical connection system. Furthermore, each safety-relevant device may easily communicate its identification electronically using for example a series of bit data thereby informing e.g. the SSU receiving its signals about its identity, function and/or location. Accordingly, various additional functionalities may be implemented in a bus-based system, such functionalities being hardly applicable in conventional analog systems.

However, it has been found that known decentralized electronic safety systems may not be applied in each of a variety of operation conditions and circumstances occurring in an elevator. Particularly, it has been found that such known systems generally may not be applied for example during installing the elevator within a building.

Accordingly, there may be a need for an electronic safety system including a car SSU and a head SSU which may be suitably applied in a wider variety of conditions and circumstances, possibly also including a phase of installing the elevator in a building. Furthermore, there may be a need for an elevator comprising such SSUs.

SUMMARY

According to an aspect of the present invention, a car safety supervising unit (SSU) for an elevator comprising an elevator car displaceable within an elevator shaft is proposed. Therein, the car SSU comprises at least one sensor, an Input/Output (I/O) interface and a signal processing unit. The sensor is adapted for sensing car-related parameters and outputting corresponding car-related signals. The I/O interface is adapted for inputting (i.e. receiving) input signals into the car SSU and for outputting (i.e. emitting) output signals to external devices. The signal processing unit is adapted for processing the car-related signals and/or the input signals and for generating the output signals. The car SSU is adapted to operate either in an installation operation mode or in a normal operation mode. In the installation operation mode, the signal processing unit processes exclusively the car-related signals and generates the output signals based exclusively on the car-related signals. In the normal operation mode, the signal processing unit processes both the car-related signals and the input signals and generates the output signals based on both the car-related signals and the input signals.

According to a second aspect of the invention, an entity safety supervising unit for an elevator comprising an elevator car displaceable within an elevator shaft is proposed. The entity SSU comprises a car SSU according to an embodiment of the first aspect of the invention and additionally comprises a head SSU. Therein, the head SSU comprises different sensors (i.e. other sensors) than the car SSU. So the sensor(s) shall be associated to the head SSU. Possibly, the sensor(s) may be included in a same unit or a same housing as other components of the head SSU such as its signal processing unit. However, it is also possible to provide the sensor(s) separate to such unit and exclusively electrically connected to such unit. The car SSU and the head SSU are adapted for exchanging the input signals and output signals between each other and for cooperating such as to accomplish safety functions of the elevator in a cooperating manner when the car SSU is operating in the normal operation mode.

According to a third aspect of the invention, an elevator comprising an elevator car displaceable within an elevator shaft and further comprising a car SSU according to an embodiment of the above first aspect of the invention, the car SSU being provided at the elevator car, is proposed.

According to a fourth aspect of the invention, an elevator comprising an elevator car displaceable within an elevator shaft and further comprising an entity SSU according to an embodiment of the above second aspect of the invention, the car SSU being provided at the elevator car and the head SSU being provided stationary and external to the car, is proposed.

Ideas underlying embodiments of the present invention may be interpreted as being based, inter alia, on the following observations and recognitions.

Upon operating an elevator, safety requirements have to be fulfilled in various conditions and circumstances. Of course, safety requirements have to be fulfilled during normal operation of the elevator, i.e. when operating the elevator in a completed building for transporting passengers. However, in order to save for example efforts and costs during constructing the building and/or installing an elevator in the building, it may be beneficial to use at least some functionalities of the elevator already during such installation phase. For example, the elevator car may be used during the installation phase as an installation platform for transporting workers, construction material and/or tools. While, during the installation phase, generally not all components of an elevator system are already present and/or fully operative, safety standards have nevertheless to be fulfilled in order to guarantee for example the safety of the workers.

Typically, an elevator installation requires several sequential steps. Explained exemplary and in a very simplified and reduced manner, first, an installation platform is set-up and a hoist is typically installed. Then, shaft components are installed. Subsequently, a drive engine and its motor as well as a motor control are installed. Finally, remaining components of the elevator are installed.

During the first step in which only the installation platform is set-up but further components of the elevator are still missing, a freefall supervision and/or an overspeed supervision as well as maybe other kinds of supervision of the installation platform are generally required in order to guarantee a sufficient safety. Nowadays, an overspeed governor and/or safety gear is typically used to ensure safety during this early phase.

However, as an idea underlying the present invention, in future elevators in which a decentralized safety system with separate car SSU and shaft SSU shall provide for fulfilling safety requirements, the car SSU shall take over the responsibility for safely operating the elevator which, in this installation phase, is only partly completed and still lacks important components which shall finally enable a full functionality of the elevator.

Using the car SSU described herein, an SSU may be provided for supervising and safely operating components of an elevator during both, an installation phase as well as a normal operation phase.

Therein, the car SSU comprises at least one sensor for sensing car-related parameters and outputting corresponding car-related signals. The car-related parameters may be any parameters which represent current characteristics and/or conditions of the elevator car. For example, the car-related parameters may be a current acceleration of the car, a current velocity of the car and/or a current location of the car within the shaft. The sensor may then output corresponding car-related signals which represent characteristics and/or values of the car-related parameters. For example, such car-related signals may indicate a magnitude and direction of an acceleration of the car, a magnitude and direction of a velocity of the car and/or a position of the car. While, at a minimum, a single sensor may be provided in the car SSU for sensing the car-related parameters, it may be beneficial to provide a multiplicity of sensors such as to enable sensing a variety of car-related parameters and/or sensing car-related parameters in a redundant manner. The sensor(s) shall be associated to the car SSU. Possibly, the sensor(s) may be included in a same unit or a same housing as other components of the car SSU such as its signal processing unit. However, it is also possible to provide the sensor(s) separate to such unit and exclusively electrically connected to such unit but still associated to the elevator car.

Furthermore, the car SSU comprises an I/O interface. On the one hand, input signals may be inputted into the car SSU via this I/O interface. Such input signals may be for example signals transmitted from another SSU such as a head SSU or signals transmitted from other sensors potentially not directly associated to the elevator car but to other elevator components such as e.g. shaft doors. On the other hand, output signals may be outputted from the car SSU via this I/O interface in order to be transmitted for example to external devices. Such external devices may be for example actuators provided in the elevator arrangement for example for fulfilling the safety requirements such as e.g. a brake to be activated upon occurrence of an overspeed of the elevator car or a safety gear (sometimes referred to as safety brake) to be activated upon occurrence of a freefall of the elevator car. In addition or as an alternative, the external device may be another SSU such as the head SSU such that the I/O interface is used to communicate with such other SSU by inputting signals coming therefrom and outputting signals thereto.

Finally, the car SSU comprises a signal processing unit which may process the car-related signals and/or the input signals and which may then generate the output signals to be outputted via the I/O interface. Such signal processing unit may comprise a central processing unit (CPU) including a processor and typically may further comprise memory for temporarily or permanently storing signals or data. Specifically, the signal processing unit may be adapted for processing the car-related signals received from the sensor(s) and may then determine whether or not a safety critical status currently applies within the elevator arrangement. If such safety critical status is detected, suitable output signals may be output via the I/O interface in order to initiate suitable counteractions such as for example activating a break or a safety gear in order to avoid an overspeed condition or stop a freefall, respectively.

In contrast to conventional decentralized electronic safety systems in which the car SSU is typically adapted for operating only in a normal operation mode in a completely installed elevator arrangement and in which the car SSU typically cooperates with a head SSU in order to, together, arrange for fulfilling safety requirements, it is proposed to specifically adapt the car SSU such as to be operable in both, an installation operation mode and a normal operation mode.

In the installation operation mode, the car SSU shall be able to fulfil at least basic or minimum safety requirements such as avoiding for example dangerous overspeed and/or freefall conditions. For such purpose, the car SSU shall comprise at least one sensor sensing car-related parameters which, upon being processed by the signal processing unit, may be used for safely detecting an occurrence of such dangerous conditions.

For such installation operation mode, the signal processing unit exclusively processes the car-related signals and generates the output signals based exclusively on the car-related signals. In other words, during the installation operation mode, output signals for e.g. controlling safety equipment of the elevator such as a break or a safety gear are determined by processing only the car-related signals which are provided by the car SSU's own sensor(s).

In the normal operation mode, the car SSU may be adapted to, additionally to fulfilling the above minimum safety requirements, fulfilling further requirements for enabling a safe and/or convenient operation of the elevator and its components during its normal operation. For example, during such normal operation, opening states of elevator doors and/or shaft doors may be supervised using suitable sensors such as door switches in order to avoid dangerous condition such as a person falling into an open elevator shaft. Furthermore, it may be determined whether the elevator car is at or close to a shaft end using for example suitable sensor such as shaft end switches. As a further example, it may be determined whether the elevator car is within a door zone close to a final stop level adjacent e.g. to a floor of the building using suitable sensors such as door zone switches in order to enable for example specific functionalities such as re-levelling of the elevator car and/or pre-opening of car doors. Typically, during normal operation mode, the car SSU does not only process the car-related signals provided by its own associated sensor(s) but may also either receive further input signals from other sensors or from e.g. a head SSU and/or may transmit car-related signals to other devices such as the head SSU. Due to such cooperation and exchange of signals, an entity SSU comprising the car SSU and other devices such as the head SSU may fulfil increased safety requirements and may, optionally, provide further functionalities.

According to an embodiment, the car SSU is adapted for accomplishing safety functions for safely operating the elevator during an installation phase in an autonomous manner.

In other words, specifically while being in the in the installation operation mode, the car SSU may autonomously perform actions for fulfilling basic safety requirements using its own sensor(s), processing the car-related signals provided by these sensor(s) and finally outputting suitable output signals to safety equipment of the elevator in order to thereby avoid safety critical situations. Accordingly, in such installation operation mode, no further car-related signals or other signals from other sensors in the elevator are required and processed but basic safety requirements are fulfilled and minimum functionalities may be enabled using the components and capabilities of the car SSU only.

According to an embodiment, the output signals are adapted for activating a safety gear of the elevator car.

Also in an installation phase in which the elevator arrangement is not yet completely installed, minimum functionalities such as means for avoiding a freefall of the elevator car must be provided. Such freefall is typically avoided or stopped using a safety gear (sometimes also referred to as safety brake) which may quickly stop any motion of the elevator car for example in case of defects such as broken belts or ropes serving as suspension means. Even with a limited number of sensors being available in the car SSU, it should be possible to quickly detect a freefall situation and initiate suitable counteractions by outputting output signals which activate the safety gear.

According to an embodiment, the at least one sensor included in the car SSU is an acceleration sensor for sensing accelerations acting onto the car SSU and for outputting acceleration signals as part of the car-related signals.

For example, such acceleration sensor may be integrated into a circuitry of the car SSU. Alternatively, the acceleration sensor may be a separate sensor being connected to the car SSU. Particularly, the acceleration sensor should be mechanically attached to the elevator car such that accelerations measured by the sensor correspond to accelerations acting onto the car. Preferably, the acceleration sensor is a microelectronics device. Specifically, the acceleration sensor should be provided with a suitable sensitivity such as to detect significant accelerations of the elevator car as typically acting upon freefall, i.e. as induced by gravity actions. Furthermore, the acceleration sensor should be able to quickly, preferably in a range of microseconds, and precisely output an electronic output signal representing the measured acceleration. Preferably, the car SSU comprises at least two acceleration sensors such that car acceleration indicating signals may be provided in a redundant manner.

According to an embodiment, the car SSU further comprises a position sensor for sensing a position of the car and for outputting position signals as part of the car-related signals.

In other words, generally in addition to an acceleration sensor, the car SSU may include a position sensor which may provide a position signal indicating the current position of the elevator car for example relative to a predetermined position within the elevator shaft. Furthermore, information on a current velocity of the car may be derived from such position signal by determining a time dependence of changes in the elevator car's position.

Therein, the current position may be determined using a variety of types of sensors relying on different physical principles. For example, the position sensor may include a roller rolling for example along a rail provided within the elevator shaft and a current position and/or velocity of the car may be determined based on an orientation and/or rotation speed of the roller. Alternatively, the position and/or velocity may be determined in a contactless manner. For example, a magnetic sensor may detect magnetic markers or an optical sensor may detect optical markers arranged at predetermined positions within the elevator shaft. As a further alternative, laser distance measuring devices may determine the current position of the elevator car using laser beams directed for example to a top and/or a bottom of the elevator shaft.

According to an embodiment, the car SSU further comprises a safety gear sensor for sensing a current status of a safety gear of the car and for outputting safety gear signals as part of the car-related signals.

Expressed differently, a specific sensor referred to herein as safety gear sensor may be adapted for sensing the current status of the safety gear, i.e. for example whether or not the safety gear is currently actuated or released, and may forward such information in the form of the safety gear signal to the signal processing unit of the car SSU. The signal processing unit may then process such information, possibly together with other car-related signals, and may generate suitable output signals taking into account the current status of the safety gear. The information about the safety gear state can be used for example to additionally stop torque on the drive and to engage additionally the functional brakes (on head SSU) if the safety gear is actuated. If there are two safety gears located at the car, the named information can also be used to detect a self-activation of one of these safety gears. In case of a self-activation of one safety gear it's necessary to activate the other safety gear, too. Otherwise a deformation of the car can occur.

According to an embodiment, the car SSU further comprises a hardware switch for switching the car SSU between the installation operation mode and the normal operation mode.

In other words, the car SSU may be provided with a switch which may be switched or actuated for example by maintenance staff in order to switch the car SSU from operating in the installation operation mode to operating in the normal operation mode, or possibly vice versa. Such switch may be provided as a separate hardware component such as e.g. a mechanical switch or any other type of which to be actuated for example by magnetic means, capacitive means, optical means, electrical means, etc.

For example, microswitches may be provided on a printed circuit board forming the car SSU. Such microswitches may be preconfigured such that the car SSU is initially operated in the installation operation mode. Upon having installed the head SSU in the elevator arrangement, the microswitches may be switched e.g. by maintenance staff to a second configuration such that the car SSU is then operated in the normal operation mode.

Alternatively or additionally, according to an embodiment, the car SSU may be adapted for switching between the installation operation mode and the normal operation mode based on the input signals inputted via the I/O interface.

In such embodiment, no additional specific hardware switch may be necessary for bringing the car SSU from the installation operation mode to the normal operation mode but the car SSU may be adapted with its own hardware and/or software in order to automatically determine when to switch from the installation operation mode to the normal operation mode, or possibly vice versa. Such determination may preferably be based on the input signals inputted at the I/O interface of the car SSU.

In other words, when for example the car SSU is to be operated in an elevator the installation of which is not yet fully completed, there are typically no external sensors or head SSU available such that no input signals are inputted at the I/O interface at that stage. However, as soon as the elevator installation is completed, the head SSU is typically available and is connected to the car SSU such as to input further signals to the car SSU's I/O interface. Upon receiving such further signals via its I/O interface, the car SSU may then realize that it may switch from the installation operation mode to the normal operation mode. Such switching may preferably be performed automatically. Accordingly, providing any additional hardware may be dispensable.

According to an embodiment, the car SSU further comprises a proprietary energy source.

Such proprietary energy source may provide energy, particularly electric energy, to energy requiring components of the car SSU. Such energy may be provided autonomously, i.e. independent from for example any electric installations within a building which, at that stage of the installation phase, may possibly not yet exist within the building. Particularly, the proprietary energy source may provide electric energy independent of an electric grid or network of the building. Accordingly, due to the energy provided by the proprietary energy source, the car SSU may already operate autonomously during the installation phase. Particularly, the appropriate area energy source may be for example a battery, particularly a buffer battery, or a capacitor.

According to an embodiment of the entity SSU comprising both the car SSU and the head SSU, the car SSU and the head SSU are adapted to, upon transition from the installation operation mode to the normal operation mode, pairing the car SSU to the head SSU.

In this context, "pairing" may mean that both the car SSU and the head SSU are "visible" to each other and information may be exchanged between the car SSU and the head SSU during a first's process of coupling these devices such that both SSU's identify themselves to the opposing device (so-called "handshake"). Furthermore, for example information about hardware and/or software versions of devices, information about functionalities of such devices, information about characteristics and/or components such as sensors, actors, etc. of the elevator arrangement and so on may be exchanged. The identification information and/or other information may be stored within one or preferably both of the SSUs.

Accordingly, in case for example an electrical connection between the SSUs is temporarily interrupted or the operation of one of the SSUs is temporarily interrupted for example due to an energy blackout, the entity SSU may resume its normal operation at a later point in time by connecting both SSUs again. Therein, due to the information exchanged upon the first pairing process, it may be ensured that only SSUs which belong together and are adapted for cooperating with each other, i.e. compatible units, can be connected. Thereby, safety and security aspects of the entity SSU may be improved as for example no car SSU or head SSU may be replaced by an unauthorized person thereby avoiding installing inappropriate replacement devices in an existing safety equipment of an elevator arrangement.

According to an embodiment of the entity SSU, the car SSU and the head SSU are adapted to, upon transition from the installation operation mode to the normal operation mode, hand-over functionalities from the car SSU to the head SSU.

In other words, when the car SSU switches from its installation operation mode to the normal operation mode, it may give-up some of its former functionalities and these functionalities are then taken over by the head SSU. Generally, during the installation operation mode, the car SSU shall perform all actions necessary for fulfilling basic safety requirements. While the car SSU may be adapted for performing all these actions autonomously, processing large volumes of signals for such purpose may reduce its operation speed. It may therefore be beneficial to recognize for example when an installation phase is completed and a head SSU is available within the elevator arrangement such that the car SSU may be switched from its installation operation mode to its normal operation mode and hand over some of its former functionalities to the head SSU.

For example, in the normal operation mode, the car SSU may typically perform only actions which necessarily relate to the elevator car itself and which for example shall be executed very rapidly such as e.g. actuating a safety gear in case of an occurring freefall. By reducing its scope of actions and handing over other functionalities to the head SSU, the car SSU may increase its operation speed for such highly safety relevant purposes.

According to an embodiment of the entity SSU, the car SSU and the head SSU are adapted to, upon replacing one of the car SSU and the head SSU, storing settings of both the car SSU and the head SSU on the remaining one of the car SSU and the head SSU.

Expressed differently, in case one of the car SSU and the head SSU of the entity SSU shall be replaced for example due to repairing or maintenance works, information included in this SSU should preferably not be lost but should be transmitted and stored within the other SSU which remains operative. Such information may for example include, inter-alia, information about the replaced SSU itself and/or information about its device environment, i.e. about devices such as sensors, actors, etc. for example cooperating with this SSU. Accordingly, upon installing a replacement device, not all information originally included in the replaced needs to be inputted again into the replacement device. Thereby, work efforts may be reduced and/or rebooting or re-coupling of the replacement device may be simplified or accelerated.

It shall be noted that possible features and advantages of embodiments of the invention are described herein partly with respect to a car SSU, partly with respect to an entity SSU comprising such car SSU and partly with respect to an elevator comprising such car SSU or entity SSU. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawing. However, neither the drawing nor the description shall be interpreted as limiting the invention.

DESCRIPTION OF THE DRAWINGS

FIG. 1 shows an elevator comprising an entity SSU including a car SSU according to an embodiment of the present invention.

The FIGURE is only schematic and not to scale.

DETAILED DESCRIPTION

FIG. 1 shows an elevator 1 according to an embodiment of the present invention. The elevator 1 comprises an elevator car 3 and a counterweight 5 arranged in an elevator shaft 7. The elevator car 3 and the counterweight 5 are suspended by a suspension traction means 9 comprising several ropes or belts. The suspension traction means 9 is driven by a traction sheave 13 of a drive engine 11. An operation of the drive engine 11 is controlled by an elevator control 15.

In order to be able to control functions of the elevator 1 and/or to guarantee its safety, the elevator 1 comprises a multiplicity of sensors 17, 19, 21, 23, 25.

For example, an acceleration sensor 17, a position sensor 19 and a safety gear sensor 21 are provided at the car 3 such that they are moved together with the car 3. The acceleration sensor 17 may determine the current acceleration of the car 3. For example, the acceleration sensor may be a microelectronics device which may output an acceleration signal being proportional to the current acceleration acting thereon. The position sensor 19 may determine a current position of the car 3 within the elevator shaft 7. For example, position marks 20 may be provided at predetermined positions within the elevator shaft 7 and by identifying these position marks, the position sensor 19 may determine its present position. The safety gear sensor 21 may determine a current status of a safety gear 31 of the elevator car 3, i.e. may determine for example whether the safety gear 31 is currently released or actuated. In FIG. 1 the safety gear 31 is positioned at the top of the car 3. It's also possible that one or two safety gears are positioned at the bottom of the car.

The elevator 1 may further comprise detectors which are positioned stationary within the elevator shaft 7. For example, door contacts 23 may be provided at each of a multiplicity of shaft doors 27 arranged at each of floors 29 of a building. These door contacts may determine whether or not an associated shaft door 27 is correctly closed. Furthermore, door zone contacts 25 may be provided. These door zone contacts 25 may determine whether or not the elevator car 3 is currently in close neighborhood to one of the shaft doors 27. Such door zone contacts 25 may either be arranged stationary within the elevator shaft 7 such as to sense a presence neighboring elevator car 3 or may be arranged at the elevator car 3 such as to sense for example markers provided stationary adjacent to each door zone.

Signals of the multiplicity of sensors 17 to 25 may be processed within an entity safety supervising unit (SSU) 33. In order to suitably process these signals and to suitably control elevator components, the entity SSU 33 is composed of two separate SSUs, namely a car SSU 35 and a head SSU 37. During normal operation of the elevator 1, both the car SSU 35 and the head SSU 37 may cooperate and may communicate with the elevator control 15 and other components of the elevator 1 such as the safety gear 31 in order to control various functionalities and safety functions of the elevator 1.

The car SSU 35 is attached to the elevator car 3 such as to be moved together with the elevator car 3. The car SSU 35 may receive car-related signals from the acceleration sensor 17, the position sensor 19 and the safety gear sensor 21, all the sensors preferably being associated to the car SSU 35. Furthermore, the car SSU 35 comprises an I/O interface 41 via which it may receive input signals for example provided by the head SSU 37 and via which it may emit output signals for controlling other devices such as the car safety gear 31. The input signals and the output signals may be processed by a signal processing unit 39.

Based for example on signals of the acceleration sensor 17 indicating a current acceleration of the elevator car 3, the car SSU 35 may then detect for example an occurrence of a freefall of the elevator car 3. Thereupon, the car SSU 35 may rapidly activate the car's safety gear 31.

The car SSU 35 furthermore comprises a proprietary energy source 43 such as a buffer battery or a capacitor of sufficiently large capacitance for supplying electrical energy. Thus, the car SSU 35 may at least temporarily operate independent of any electricity supply from e.g. a building's grid.

The head SSU 37 may be connected to the plurality of shaft door sensors 23 and door zone sensors 25. Therein, each of the shaft door sensors 23 and the door zone sensors 25 may be connected to a bus 45 such as to enable signal transmittance to the head SSU 37 with a minimum of wiring efforts.

Using the car SSU 35 and the head SSU 37 in corporation, the entity SSU 33 may monitor for a multiplicity of conditions in the elevator 1 using the variety of different sensors 17 to 25 and may control functions of the elevator 1 based on signals provided by these sensors, possibly after suitable processing thereof. Particularly, during normal operation of the elevator 1, the entity SSU 33 may supervise all safety critical conditions such as an occurrence of a freefall of the elevator car 3, the elevator car 3 reaching an end zone of the elevator shaft 7, at least one of the shaft doors 27 being open without the car 3 being stopped adjacent to this shaft door 27 and/or other safety-related conditions. During such normal operation, each of the car SSU 35 and the head SSU 37 may receive signals from its associated sensors 17 to 25 and may process these signals and/or may transmit signals to the other one of the head SSU 37 and the car SSU 35. In other words, the entire safety supervising efforts may be shared between the car SSU 35 and the head SSU 37 during normal operation.

However, additional to such normal operation mode, the car SSU 35 as proposed herein shall be specifically adapted to provide for at least some basic safety supervising functionalities in an autonomous manner, i.e. without necessarily cooperating with the head SSU 37. Accordingly, the car SSU 35 may provide these basic safety supervising functionalities also in conditions, in which an installation of elevator components in a building is not yet fully completed.

For example, as part of an elevator installation procedure, a provisional installation platform and a hoist may be set-up in the elevator shaft 7. During such installation phase, at least freefall conditions and preferably also overspeed conditions shall be supervised. While this object is conventionally fulfilled using an overspeed governor/safety year, future safety supervising approaches shall preferably use the car SSU 35 for such purposes, this car SSU 35 being later part of the entity SSU 33 upon completion of all installation works, i.e. for subsequent normal operation.

Accordingly, the car SSU 35 should be adapted for, additionally to a normal operation mode, being operated in an installation operation mode. In such installation operation mode, the car SSU 35 should perform all safety supervising operations based on information signals of a limited number of sensors 17, 19, 21. For enabling such basic safety supervising operations, the car SSU 35 may at least comprise the acceleration sensor 17 for detecting freefall conditions. Possibly, further sensors such as the position sensor 19 and/or the safety gear sensor 21 may be provided. The car SSU 35 may process the car-related parameters provided by these sensors 17, 19, 21 using its signal processing unit 39 and may then transmit suitable output signals via its I/O interface 41 in order to control devices such as for example the safety gear 31.

During such installation operation mode, no cooperation with other devices such as additional sensors and/or additional SSUs such as the head SSU 37 is required.

Furthermore, during such installation mode, the proprietary energy source 43 may supply electricity to energy consuming components of the car SSU 35 such that the car SSU 35 may be used during installing the elevator in a construction area where for example no reliable power network is available.

After completion of all elevator installation works, i.e. once the electrical system of the elevator is installed and the head SSU 37 and its associated sensors 23, 25 are installed in the elevator shaft 7, the car SSU 35 may be switched to its normal operation mode.

For such switching, the car SSU 35 may comprise a specific hardware switch 40 which may be actuated for example by authorized technical staff. Alternatively, the car SSU 35 may be adapted to automatically realize upon receiving input signals via its I/O interface 41 that for example a communication with a connected head SSU 37 is possible after completion of installation works and to then automatically switch to the normal operation mode.

Upon switching from the installation operation mode to the normal operation mode, the following steps may be performed.

First, the car SSU 35 and the head SSU 37 may be paired. This may ensure that only SSUs may be connected to each other and may cooperate with each other which SSUs are compatible with each other. Thereby, safety and security aspects may be satisfied.

Then, certain functionalities may be handed over from the car SSU 35 to the head SSU 37. During such hand-over process, configurations may be compared and/or replicated. Furthermore, actors and/or sensors may be specifically allocated to either the car SSU 35 or the head SSU 37. Due to such handing over, available resources may be used in a beneficial manner and/or time restrictions for example in processing signals and initiating actions thereupon such as actuating a safety gear 31 may be taken into account in a more efficient manner than for example during the installation operation mode.

The transfer of certain functionalities could comprise for example the following steps: a configuration with a necessary functionality may be read-out or a necessary functionality may be specifically learned for example through a presence of sensors and actuators. Alternatively or additionally, such configuration may be performed using a mobile device or may be submitted via a centralized server. Optionally, configurations may be replicated. Supervising functionalities may be physically allocated to the car SSU 35 or the head SSU 37 depending e.g. on available actors, measured signal propagation times and/or country specific conditions. The functionality may then be handed over. A self test and/or timing measurement may be performed as they might be necessary due to different possible configurations. The configuration may be frozen. Finally, pair locking may be performed.

Finally, an acceptance tests of the safety system may be done.

After having finalized the pairing of the car SSU 35 and the head SSU 37, the hand-over of functionalities between the car SSU 35 and the head SSU 37 and finally the acceptance tests, the entity SSU 33 may be fully operated with the car SSU 35 being switched to its normal operation mode.

If, during the normal operation mode, any replacement of the car SSU 35 or the head SSU 37 is required, settings such as current configurations of the car SSU 35 and the head SSU 37 may be temporarily stored in the remaining one of both SSUs 35, 37 such that, after the replacement device has been installed, these settings may be transferred to the replacement device for simplifying a configuration thereof.

Finally, it should be noted that the term "comprising" does not exclude other elements or steps and the "a" or "an" does not exclude a plurality. Also elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 elevator
3 elevator car
5 counterweight
7 elevator shaft
9 suspension traction means
11 drive engine
13 traction sheave
15 elevator control
17 acceleration sensor
19 position sensor
20 position marks
21 safety gear sensor
23 door sensor/contact
25 door zone sensor/contact
27 shaft door
29 floor
31 safety gear
33 entity SSU
35 car SSU
37 head SSU
39 signal processing unit
40 hardware switch
41 I/O interface
43 proprietary energy source
45 bus

The invention claimed is:

1. A car safety supervising unit for an elevator, the elevator including an elevator car displaceable within an elevator shaft, the car safety supervising unit comprising:

at least one sensor sensing car-related parameters and outputting corresponding car-related signals;

an I/O interface inputting input signals into the car safety supervising unit and outputting output signals to external devices;

a signal processing unit processing at least one of the car-related signals and the input signals and generating the output signals;

wherein the car safety supervising unit is adapted to operate in each one of an installation operation mode and a normal operation mode;

wherein, in the installation operation mode, the signal processing unit processes exclusively the car-related signals and generates the output signals based exclusively on the car-related signals; and wherein, in the normal operation mode, the signal processing unit processes both the car-related signals and the input signals and generates the output signals based on both the car-related signals and the input signals.

2. The car safety supervising unit according to claim 1 wherein the car safety supervising unit performs safety functions for safely operating the elevator during an installation phase in an autonomous manner.

3. The car safety supervising unit according to claim 1 wherein the output signals activate a safety gear of the elevator car.

4. The car safety supervising unit according to claim 1 wherein the at least one sensor is an acceleration sensor sensing accelerations acting onto the car safety supervising unit and outputting acceleration signals as part of the car-related signals.

5. The car safety supervising unit according to claim 1 including a position sensor sensing a position of the car and outputting position signals as part of the car-related signals.

6. The car safety supervising unit according to claim 1 including a safety gear sensor sensing a current status of a safety gear of the car and outputting safety gear signals as part of the car-related signals.

7. The car safety supervising unit according to claim 1 including a hardware switch for switching the car safety supervising unit between the installation operation mode and the normal operation mode.

8. The car safety supervising unit according to claim 1 wherein the car safety supervising unit is adapted for switching between the installation operation mode and the normal operation mode based on the input signals inputted via the I/O interface.

9. The car safety supervising unit according to claim 1 including a proprietary energy source supplying electrical energy to the car safety supervising unit.

10. An elevator comprising:

an elevator car displaceable within an elevator shaft; and the car safety supervising unit according to claim 1 attached to the elevator car.

11. An entity safety supervising unit for an elevator, the elevator including an elevator car displaceable within an elevator shaft, the entity safety supervising unit comprising:

the safety supervising unit according to claim 1;

a head safety supervising unit;

wherein the head safety supervising unit includes different sensors than the at least one sensor of the car safety supervising unit;

wherein the car safety supervising unit and the head safety supervising unit exchange the input signals and the output signals; and wherein the car safety supervising unit and the head safety supervising unit cooperate to perform safety functions of the elevator in a cooperating manner when the car safety supervising unit is operating in the normal operation mode.

12. The entity safety supervising unit according to claim 11 wherein the car safety supervising unit and the head safety supervising unit, upon transition from the installation operation mode to the normal operation mode, pair the car safety supervising unit to the head safety supervising unit.

13. The entity safety supervising unit according to claim 11 wherein the car safety supervising unit and the head safety supervising unit, upon transition from the installation operation mode to the normal operation mode, hand over functionalities from the car safety supervising unit to the head safety supervising unit.

14. The entity safety supervising unit according to claim 11 wherein the car safety supervising unit and the head safety supervising unit, upon replacing one of the car safety supervising unit and the head safety supervising unit, store settings of both the car safety supervising unit and the head safety supervising in a remaining one of the car safety supervising unit and the head safety supervising unit.

15. An elevator comprising:

an elevator car displaceable within an elevator shaft; and the entity safety supervising unit according to claim 11 wherein the car safety supervising unit is attached at the elevator car and the head safety supervising unit is stationary relative to and external to the elevator car.

* * * * *